April 21, 1964 — W. C. YOUNGER — 3,130,355
ELECTROMAGNET
Filed May 3, 1961 — 2 Sheets-Sheet 1
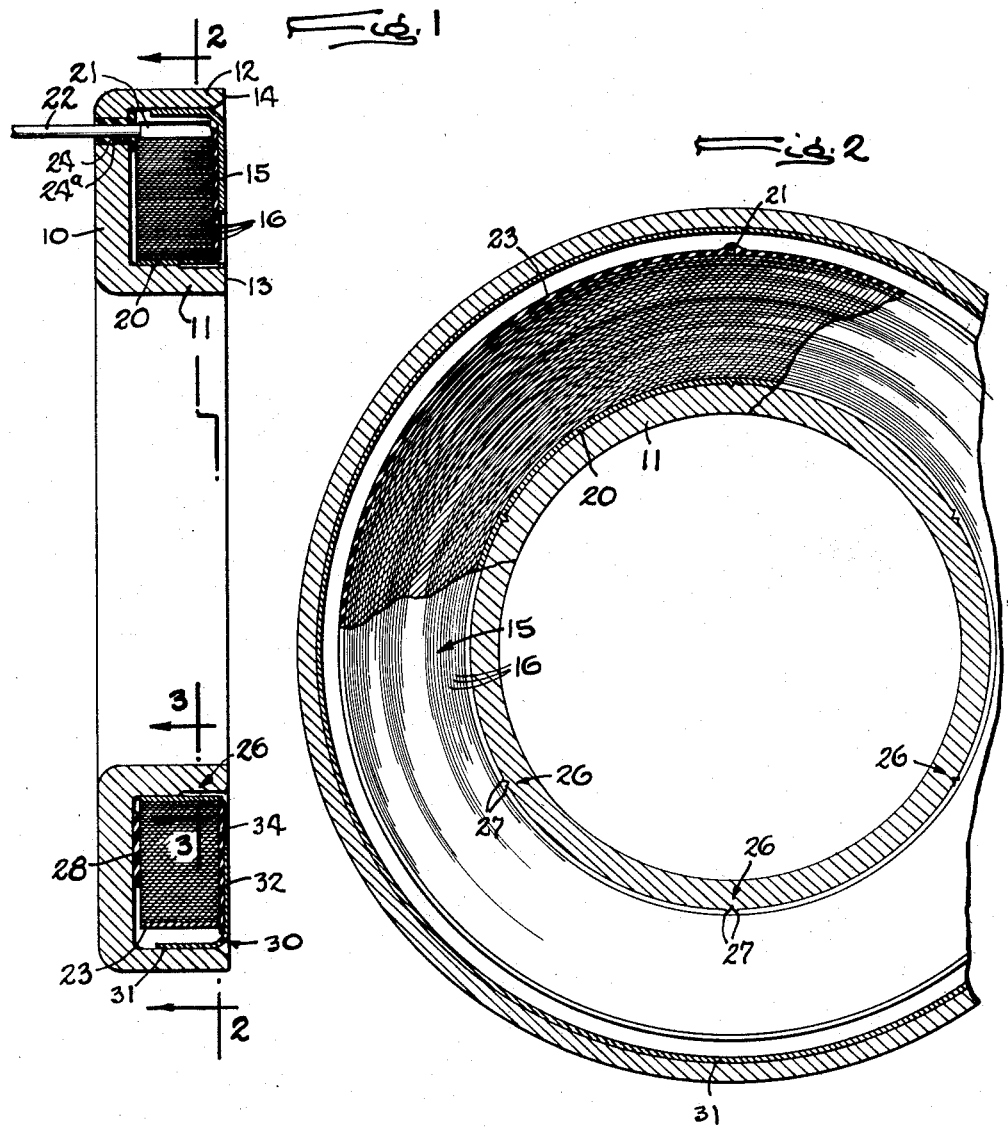
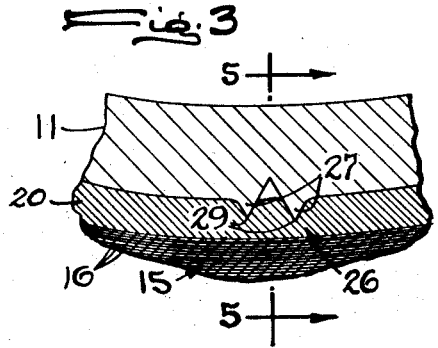
INVENTOR
William C. Younger
By Wolfe, Hubbard, Voit & Osann
ATTORNEYS April 21, 1964   W. C. YOUNGER   3,130,355
ELECTROMAGNET
Filed May 3, 1961   2 Sheets-Sheet 2
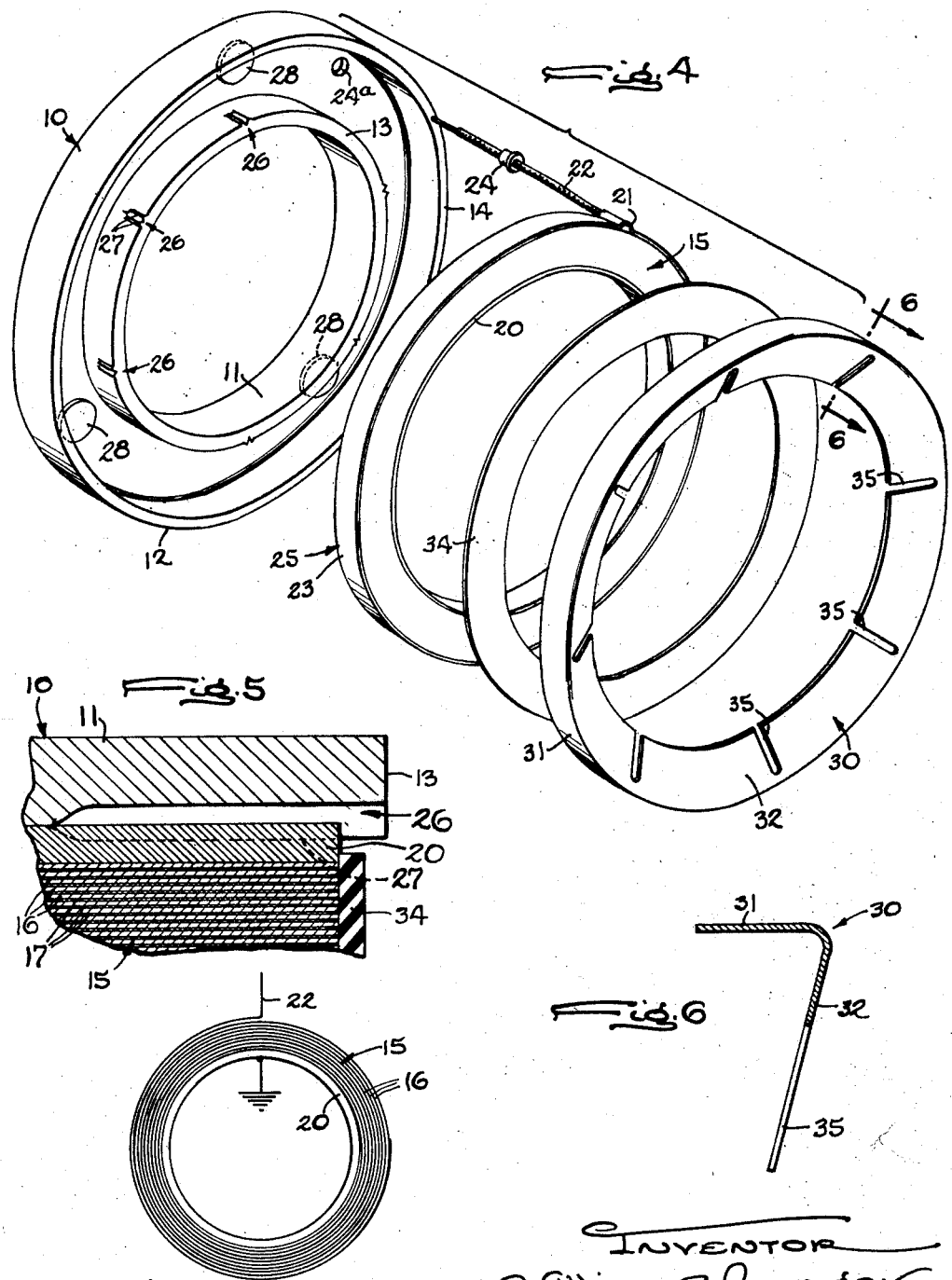
INVENTOR
William C. Younger
By Wolfe, Hubbard, Voit & Osann
ATTORNEYS

3,130,355
ELECTROMAGNET

William C. Younger, Beloit, Wis., assignor to Warner Electric Brake & Clutch Company, South Beloit, Ill., a corporation of Delaware
Filed May 3, 1961, Ser. No. 107,413
6 Claims. (Cl. 317—158)

This invention relates to an electromagnet having a multiple turn winding in the form of an annulus telescoped with an annular magnetic pole piece, and has more particular reference to a magnet in which the winding comprises a spirally wound coil of metallic foil.

The primary object of the invention is to provide a new and improved means for electrically connecting one terminal of the magnet winding to the magnet core.

Another object is to achieve such electrical connection automatically as an incident to pressing the winding and the pole piece of said core into telescoped relation.

A further object is to provide a new and improved means for anchoring the spirally wound winding on the magnetic core.

The invention also resides in the novel construction of means for effecting the connection between the magnet core and the foil of the terminal of the spiral winding.

Other objects and advantages of the invention will become apparent from the following detailed description taken in connection with the accompanying drawings, in which:

FIGURE 1 is a diametrical cross-sectional view of a magnet embodying the features of the present invention.

FIGS. 2 and 3 are fragmentary sectional views taken respectively along the lines 2—2 and 3—3 of FIG. 1.

FIG. 4 is an exploded perspective view of the different parts of the improved magnet.

FIG. 5 is a fragmentary section taken along the line 5—5 of FIG. 3, the parts being shown on an exaggerated scale.

FIG. 6 is a fragmentary section taken along the line 6—6 in FIG. 4.

FIG. 7 is a diagrammatic view showing the turns of the magnetic coil.

In the drawings, the invention is shown incorporated in an electromagnet comprising a generally U-shaped core 10 of magnetic iron having concentric inner and outer substantially cylindrical pole pieces 11 and 12 terminating in pole faces 13 and 14 and enclosing a winding 15 comprising an elongated strip or ribbon 16 of thin flat and flexible foil spirally wound to provide a multiplicity of turns. The latter are insulated electrically from each other by an extremely thin film 17 of non-magnetic material such as quick setting plastic which may, if desired, be sprayed onto the foil in the course of the winding of the coil.

Aluminium foil about .0023 of an inch thick is preferably employed to form a coil of about 300 turns having a radial thickness less than the spacing of the pole pieces 11 and 12. Usually the foil employed is somewhat narrower than the length of the pole piece on which the coil is to be mounted, the coil when seated in the magnet core thus being disposed below the plane of the pole faces 13 and 14.

To facilitate winding of the coil into a true annulus, the foil is preferably wound tightly around and onto a thin but relatively rigid cylindrical tube 20 of aluminium or other relatively soft metal while the latter is supported on a rotating mandrel. The bared inner end portion of the foil lies in firm electrical contact with the ring 20 over a substantial part of the inner turn of the spiral coil which itself possesses substantial rigidity. The inner turn of the spiral, like the others, is separated from the adjacent turn by the sprayed on plastic film 17.

In the winding operation, the entire coil becomes tightly secured to the ring 20 which preferably remains as a part of the coil when the latter is mounted in the magnet core. The ring thus forms at the inner end of the spiral an electrical terminal which extends around the entire periphery of the coil.

At the outer end of the spiral winding, the foil is bared and soldered or otherwise suitably secured at 21 to one end of an insulated lead wire 22, after which the entire outer periphery of the annulus is covered by a non-metallic layer 23 such as a suitable adhesive tape. From the connection 21, the lead wire extends along the winding axis at the radius of a hole in an insulating bushing 24 pressed into a hole 24ª in the magnet core near the outer pole piece 12. It will be apparent that the spiral winding 15, the tube 20, the insulating layer 23 and the lead wire 22 form a unitary assembly 25 (FIG. 4) which may be inserted axially into the magnet core 10 between the pole pieces thereof.

In accordance with the present invention, the rigid assembly 25 is secured to the magnet core 10 by telescoping the same with one of the pole pieces of the magnet with a close press fit as an incident to which the adjacent terminal of the winding becomes electrically connected or grounded automatically to the pole piece. Since the spiral coil is, for economy of manufacture, wound around the exterior of the supporting tube 20, the assembly 25 is pressed onto and around the inner pole piece 11, the tube being correlated in diameter with this pole piece so as to provide the desired tightness of the press fit.

To insure proper grounding of the winding and secure attachment of the assembly to the magnet core, one or more lugs 26 are preferably formed on the periphery of the pole piece and adapted to bite into the metallic winding terminal during the telescoping operation. Herein, a plurality of such lugs are angularly spaced around the pole piece and formed out of the metal thereof in a deforming operation performed by suitable dies as is well understood in the metal working art. Preferably, each lug 26 comprises a pair of closely spaced parallel ribs 27 about .050 of an inch thick and of V-shaped cross-section as shown in FIG. 3. These ribs extend over a substantial axial length of the pole piece 11. The relatively sharp apices 29 of the rib are disposed at a radius slightly greater by about .040 of an inch than that of the internal radius of the coil ring 20.

With the pole piece 11 thus constructed, it will be apparent that when the coil assembly 25 is centered on the magnet core and pressed in between the pole pieces thereof, the tips 29 of the ribs will cut through the metal around the interior of the ring 20 and thus become interlocked mechanically with the ring and also securely connected electrically with the latter at a plurality of points.

Preparatory to inserting the assembly 25, the lead wire 22 is threaded through the bushing with the terminal connection 21 alined with the hole therein. The assembly is pressed into the magnet core until the inner end comes against a flat disk 28 of cardboard or other suitable insulating material.

After insertion into the magnet, the coil assembly is, as a precautionary measure, locked securely against reverse displacement axially. This may be accomplished for example by deforming the metal at the exposed ends of the ribs and turning the same outwardly to form a stop overlapping the edge of the inserted coil assembly. In the present instance, the stop is formed by a separate metal ring 30 of angular cross-section as shown in FIG. 6 having a cylindrical flange 31 sized to fit snugly within the outer pole piece of the magnet when pressed axially into the latter. Initially, the other flange 32 of the ring is coned or dished inwardly and split radially to form a plurality of angularly spaced slits 35. Thus as the ring is pressed into the pole piece, the inner edge of the ring comes against a flat insulating ring 34 covering the outer end of the coil assembly and then is bent outward axially as the inserting movement is continued. Thus, the flange 32 becomes flattened as shown in FIG. 1 when the ring is fully inserted with the coil assembly fully seated in the magnet core.

Through the use of the lugs 26 biting into the inner terminal of the winding 15 in the manner above described, it will be apparent that the winding is locked positively against angular displacement relative to the magnet core and that a good electrical connection is always established between the core and the winding terminal to be grounded. The lugs 26 may penetrate to different depths in the ring 20 thus avoiding the necessity of forming the telescoping parts with close tolerances.

All of the parts are of low cost construction including the spirally wound foil, and assembly of the magnet core is by simple pressing operations.

I claim as my invention:

1. An electromagnet having, in combination, an elongated ribbon of conductive material spirally wound in a multiplicity of turns to form an annular coil, a core of magnetic conductive material including a generally cylindrical pole piece telescoped with said coil with a tight press fit, and means acting as an incident to telescoping of said pole piece and coil to deform a terminal of said coil and establish a permanent electrical connection between the terminal and said pole piece, said last mentioned means comprising a lug formed on and projecting radially from said pole piece.

2. An electromagnet having, in combination, an electrically conductive ring, a spirally wound coil closely telescoped with said ring and having a terminal turn electrically connected thereto by contact between substantial circumferentially extending areas of the opposed faces of the ring and terminal turn, an annular core of magnetic material including a pole piece telescoped with said ring, and means providing a tight press fit between the opposed surfaces of said pole piece and said ring and electrically connecting the two, said last mentioned means comprising a radially extending projection on said pole piece biting into said ring.

3. An electromagnet as defined in claim 2 in which said projection is of generally V-shaped cross-section.

4. An electromagnet as defined in claim 2 in which said last mentioned means comprises a plurality of projections of V-shaped cross-section angularly spaced around said pole piece.

5. An electromagnet having, in combination, a magnet core including an annular pole piece having angularly spaced lugs projecting radially therefrom, an annular spirally wound conductive winding of different diameter than said pole piece and axially pressed into telescoped relation with respect to said pole pieces, said lugs biting into a terminal of said winding to provide a firm electrical connection between said core and said terminal.

6. An electromagnet having, in combination, a magnet core having an annular pole piece with a short lug projecting radially from the periphery thereof, a winding comprising a conductive ribbon wound spirally into a relatively rigid annulus sized to telescope with said pole piece and engage said lug with a fit sufficiently tight to establish a permanent electrical connection between the terminal portion of said winding through the medium of said lug, and means secured to said core and overlapping the outer end of the inserted winding to hold the latter seated positively in said core.

References Cited in the file of this patent

UNITED STATES PATENTS

| 2,921,242 | Leitch | Jan. 12, 1960 |
| 2,946,973 | Lufcy | July 26, 1960 |
| 3,032,729 | Fluegel | May 1, 1962 |